United States Patent [19]

Ostermann

[11] 4,280,448

[45] Jul. 28, 1981

[54] LIVESTOCK SORTING DEVICE

[76] Inventor: Jerry L. Ostermann, P.O. Box 188, Sylvan Grove, Kans. 67481

[21] Appl. No.: 123,751

[22] Filed: Feb. 22, 1980

[51] Int. Cl.³ .......................................... A01K 29/00
[52] U.S. Cl. .................................................. 119/155
[58] Field of Search ....................... 119/155, 98, 99, 20

[56] References Cited

U.S. PATENT DOCUMENTS

| | | | |
|---|---|---|---|
| 148,456 | 3/1874 | Hetfield | 119/20 |
| 182,688 | 9/1876 | Minor | 119/155 |
| 262,373 | 8/1882 | Cole | 119/155 |
| 1,348,343 | 8/1920 | Zimmerman | 119/20 |
| 2,504,214 | 4/1950 | Miller et al. | 119/155 |
| 2,691,231 | 10/1954 | Cook | 119/155 |
| 2,715,387 | 8/1955 | Marmet | 119/155 |
| 2,851,993 | 9/1958 | Hettinger | 119/99 |
| 3,072,100 | 1/1963 | Dustin | 119/155 |
| 3,167,053 | 1/1965 | McDaniel | 119/98 |
| 3,299,856 | 1/1967 | Fogle | 119/99 |
| 4,006,717 | 2/1977 | Hicks | 119/155 |
| 4,134,366 | 1/1979 | Elliott | 119/155 |
| 4,138,968 | 2/1979 | Ostermann | 119/155 |
| 4,145,994 | 3/1979 | Miller | 119/155 |
| 4,175,517 | 11/1979 | Kilgore | 119/155 |

*Primary Examiner*—Hugh R. Chamblee
*Attorney, Agent, or Firm*—Fishburn, Gold and Litman

[57] ABSTRACT

An animal sorting device is provided wherein the animals are individually weighed in a chute which has an exit opening into two segregation areas. A pair of exit gates and control mechanism therefor allow selective blockage of the exit or alternatively direct egress of an animal from the chute into one of the two areas. The control mechanism for the exit gates allows for remote operation thereof and for securing the exit gates in a desired position such that the animals cannot reposition same. An entrance gate is also provided. The exit gates and entrance gate may be manipulated by a single operator from a single location.

5 Claims, 9 Drawing Figures

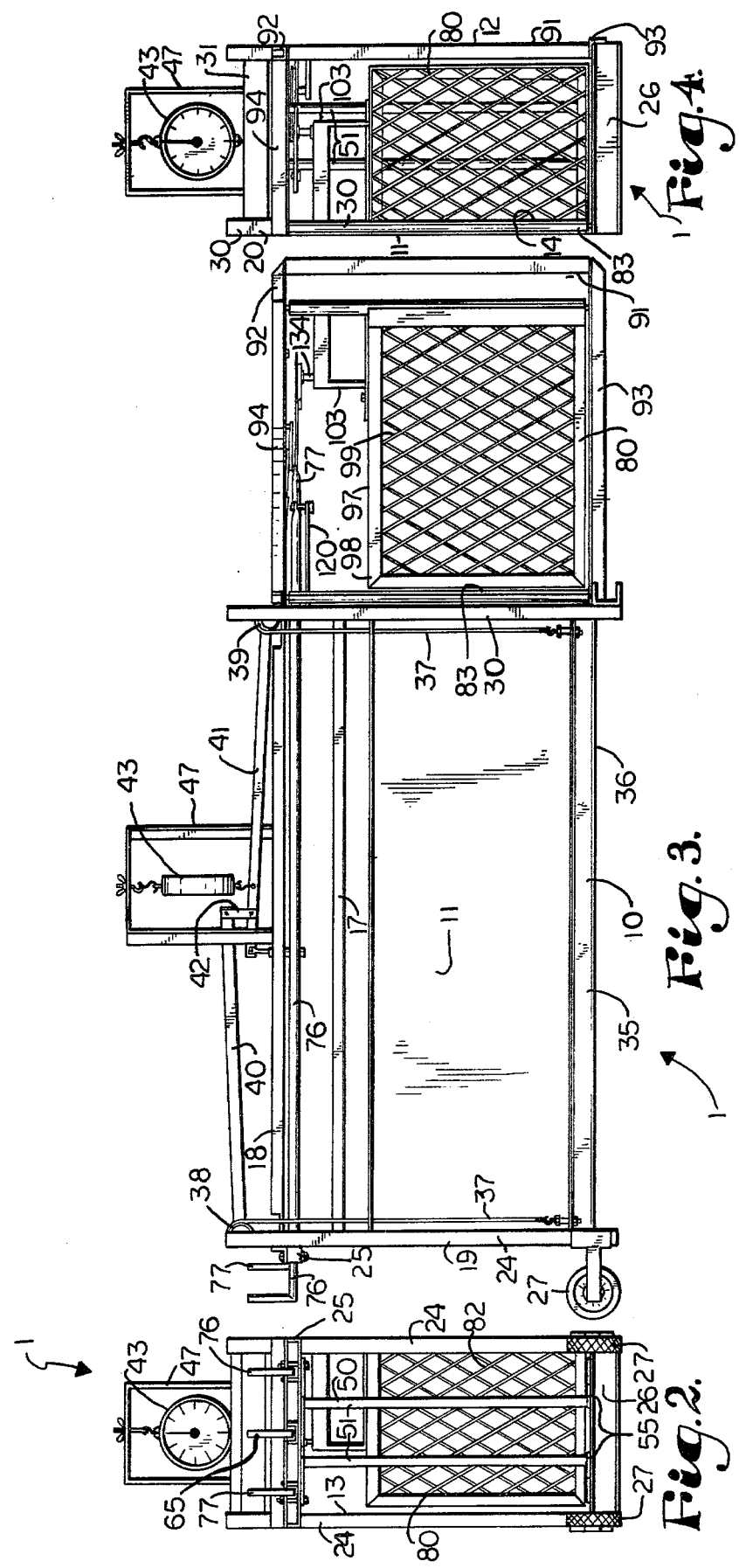

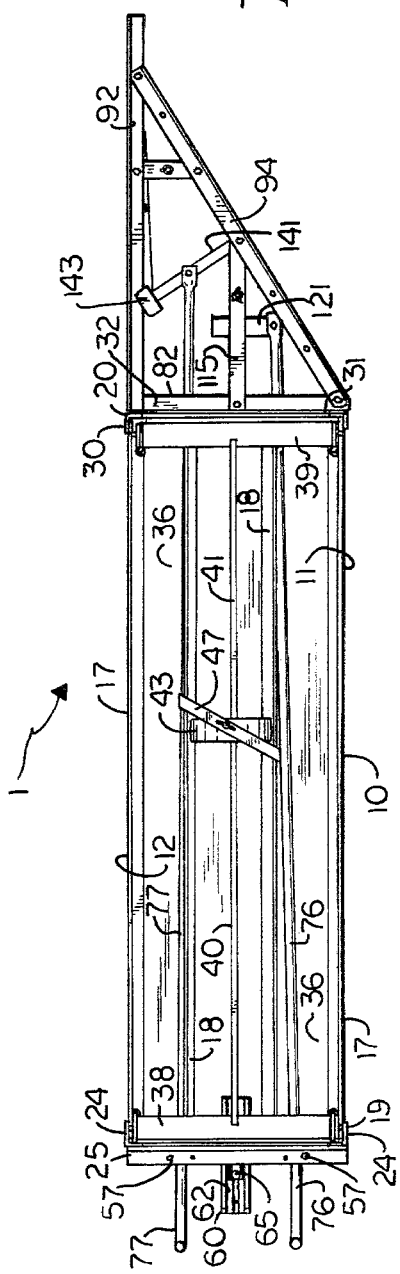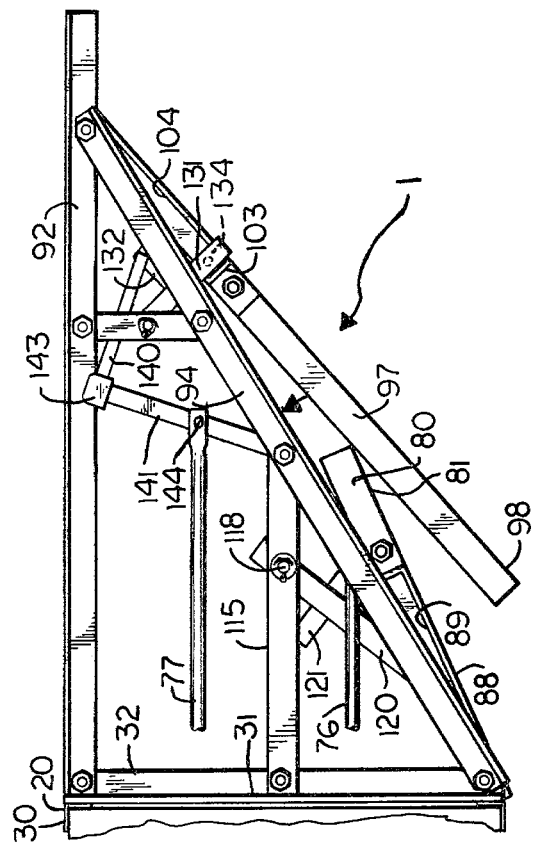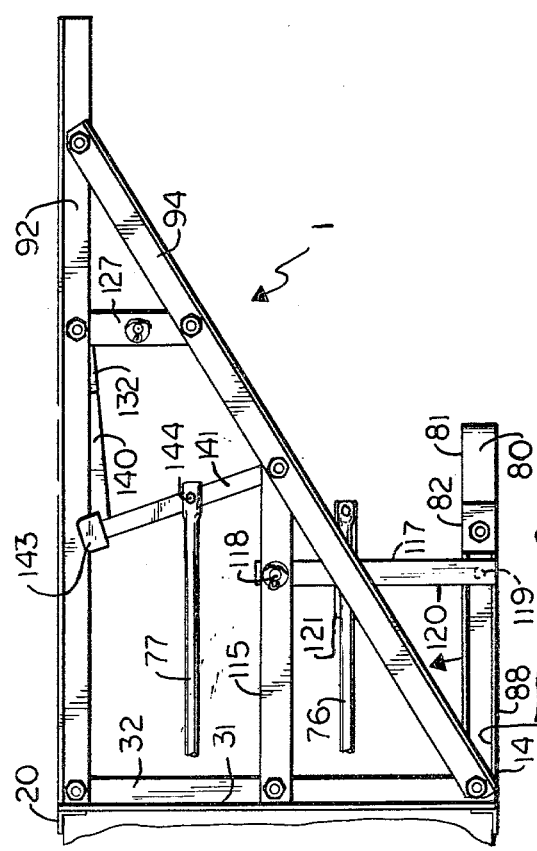

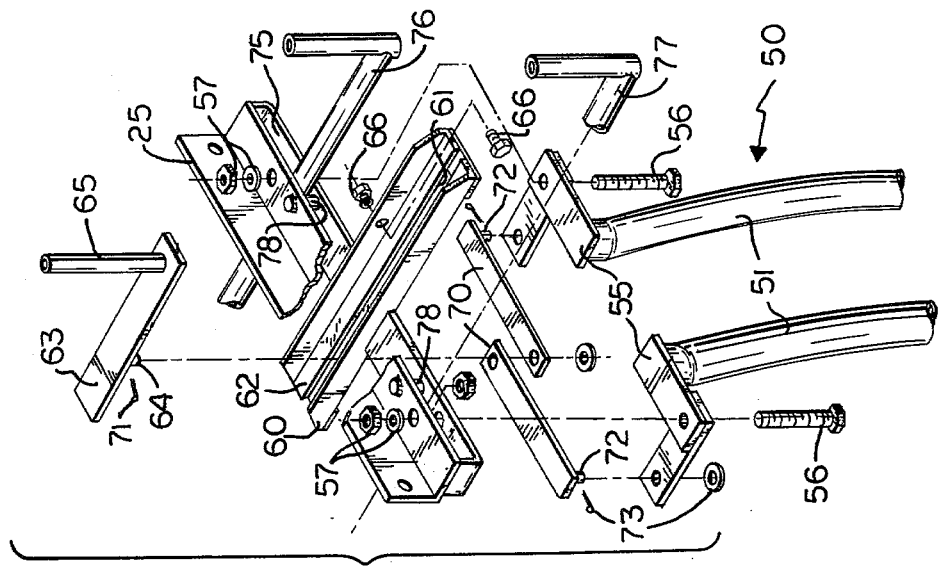
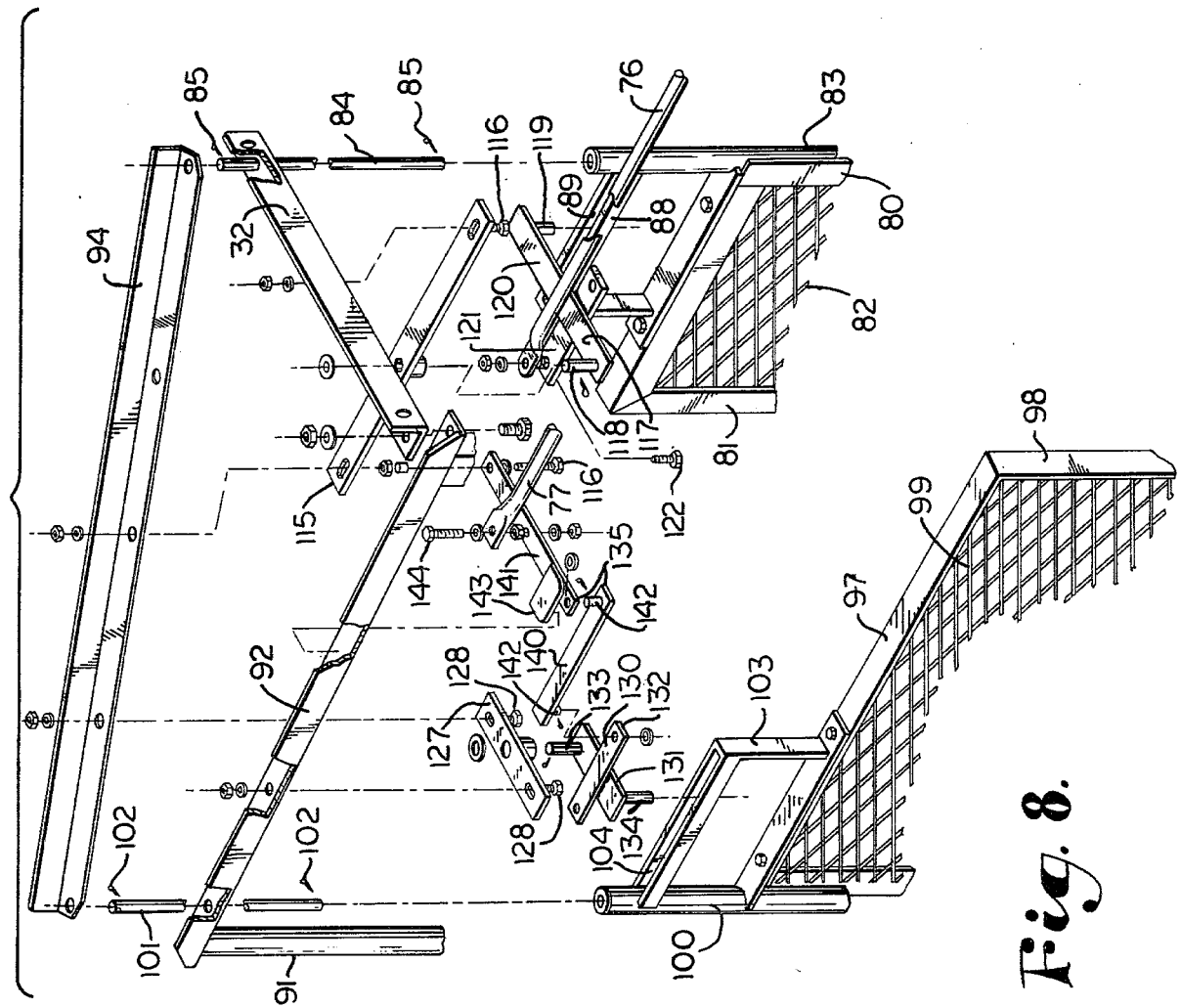

LIVESTOCK SORTING DEVICE

BACKGROUND OF THE INVENTION

The present invention relates to a sorting device for animals, and in particular to a device wherein livestock are segregated according to weight classifications.

It is a common practice in the livestock industry, especially in the pig or hog raising business to closely watch the weight of various animals and segregate them based upon a predetermined weight which will provide a maximum financial return under prevailing market conditions.

Various conventional devices have been developed for sorting animals in one enclosure into second and third enclosures depending on whether or not respectively the animal has reached a predetermined weight. However, many of the conventional devices are relatively expensive, especially those which work automatically, whereas those which are not expensive are relatively labor intensive and often require several operators.

Therefore, a sorting device is desired which will allow mechanical separation of animals into segregated areas. It is also important to not overly arouse the animals so they will not injure themselves and to minimize dangerous parts common in conventional animal sorters. In addition, it is desirable to have a device which is relatively inexpensive, yet will allow operation thereof by a single operator from a single location and require a minimum number of mechanical operations. It is also desirable to have a device wherein the animal while being weighed cannot easily exit the device in either direction until the weighing process is complete.

SUMMARY OF THE INVENTION

A livestock sorting device is provided which includes a chute suitable for allowing a single animal to ambulate therethrough and weighing means such as a floor scale associated with the chute and providing an indication of the animal's weight to an operator while the animal is within the chute. The chute also includes an entrance, an exit and side animal restraining walls. The sorting device is generally associated with at least three animal segregation areas or holding pens with one pen being located at the entrance to the chute, while the exit of the chute opens into passageways to the second and third pens. The chute entrance has a gate with an associated control mechanism which entrance gate allows an operator to selectively admit a single animal from the first pen to the chute. The chute exit has first and second gates associated therewith. The exit gates selectively prevent egress from the chute by an animal therein or direct an animal egressing from the chute into a desired passageway leading to one of the second and third pens. In this manner an animal is held in the chute until an accurate measurement is made of the animal's weight after which the exit gates are arranged to allow the animal to pass into either the second or third holding pens wherein the animal is segregated with animals of a certain predetermined similar weight and away from animals having differing weights. In this way those animals which have obtained predetermined market weight can be separated from those animals which have not reached such a weight. The entrance gate and exit gates are preferably manipulated by control mechanisms which allow an operator to remotely change the positions of the various gates and, in particular, to change the gate positions from a centralized location. In this manner a single operator is able to quickly and easily sort a large number of animals with a minimal amount of work being required to close and open the various gates. Also preferably the gates include a securing means or locking mechanism whereby when the gates are placed in a selected position by an operator, an animal cannot easily move the gate and thereby escape from the sorting device before proper weighing or obtain passage into the wrong holding pen. In particular, the exit gates include a slot radially extending from a pivotal end of the gate along the top edge thereof. A horizontally aligned lever arm for each exit gate having a vertically aligned slot follower or pin at a distal end thereof is pivotally mounted on the sorting device a spaced distance from the respective gate such that the pin mates with and slides in the slot. The lever arm is also located with respect to an associated gate such that when the associated gate is in an animal restrictive position the lever arm is generally or preferably slightly over center with respect to a perpendicular line associated with the respective gates; in particular, the lever arm is positioned so as to be slightly on the opposite side of a line perpendicular to an associated gate as the side on which the lever arm normally moves during manipulation of the associated gate to another position. In this manner an animal pushing against the associated gate cannot easily move the latter when the lever arm is perpendicular thereto. In addition when the lever arm is in the over center position, the animal cannot move the associated gate but an insignificant distance. A mechanical advantage means such as a second lever arm is secured to each of the gate operating lever arms such that an operator can easily rotate the gate operating lever arms thereby manipulating the exit gates. The exit gates are also covered with a wire mesh or the like so that an animal to be sorted can see through the sorting device and will therefore be encouraged to enter the device, yet the mesh keeps the animal from fighting or becoming entangled in the gate.

OBJECTS OF THE INVENTION

Therefore the principal objects of the present invention are: to provide a livestock sorter wherein animals may be weighed and segregated according to weight; to provide such a sorter wherein two pivotal gates are arranged whereat the animals egress the sorter to selectively block passage of the animals during weighing and to restrict passage of the animals to one of two holding pens after weighing; to provide such a sorter wherein an entrance of the sorter may also be selectively blocked to prevent animals from entering the sorter or animals already therein from exiting through the entrance; to provide such a sorter wherein one operater may manipulate mechanisms to operate the gates and to block the entrance from a single location; to provide such a sorter wherein the gates are generally secured against movement by an animal when in positions to allow egress or block passage from the sorter; to provide such a sorter which is economical to manufacture, efficient in use, and which is particularly well adapted for the proposed usage thereof.

Other objects and advantages of this invention will become apparent from the following description taken in connection with the accompanying drawings wherein are set forth by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 2 is a front elevational view of the sorter.

FIG. 3 is a side elevational view of the sorter.

FIG. 4 is a rear elevational view of the sorter.

FIG. 5 is a top plan view of the sorter with the exit gates in position to block egress therefrom.

FIG. 6 is an enlarged fragmentary top plan view of the sorter with the exit gates in position to direct egress of an animal into a first holding area.

FIG. 7 is an enlarged fragmentary top plan view of the sorter with the gates in position to direct egress of an animal into a second holding area.

FIG. 8 is an enlarged and partially exploded fragmentary view of a control mechanism for the exit gates.

FIG. 9 is an enlarged and partially exploded fragmentary view of a control mechanism for the entrance gate.

DETAILED DESCRIPTION OF THE PREFERRED EMBODIMENT

Figure 1:
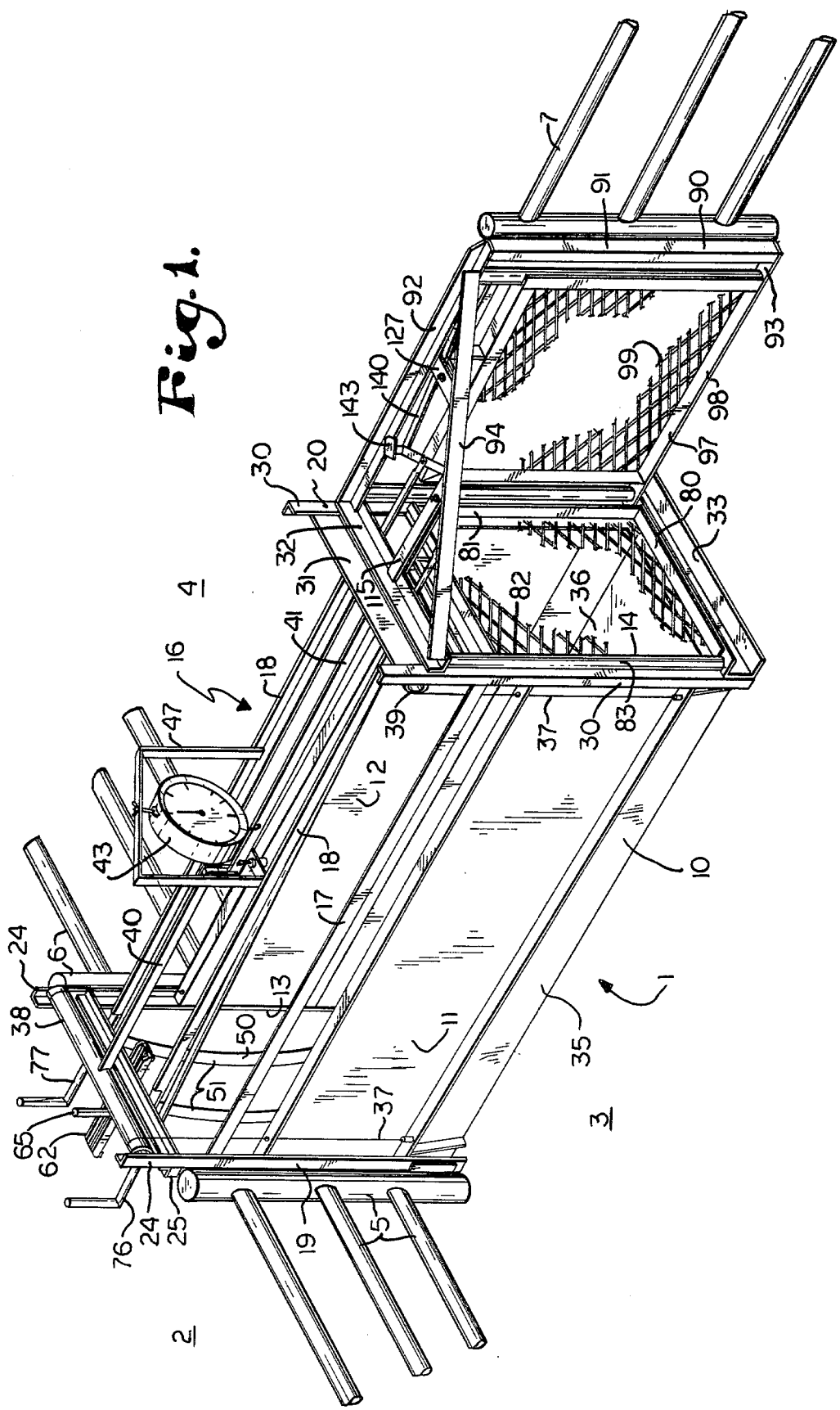
FIG. 1 is a perspective view of a livestock sorter, according to the present invention, including a weighing portion with an entrance gate and a pair of exit gates.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

As used herein the terms "front" and "entrance end" mean in the direction of the left hand side of the page with respect to the views seen in FIGS. 3 and 5 and the terms "rear" and "exit end" have the opposite meaning. Other directional terms as used herein have the same meanings as described in the drawings.

The reference numeral 1 generally designates a livestock sorter according to the present invention. As seen in FIG. 1, the sorter 1 is generally positioned such that a first animal holding pen or segregation area 2 is located in adjoining fashion to the entrance end of the sorter 1 and second and third holding pens or segregation areas 3 and 4 are located in adjoining fashion to the exit end of the sorter 1. Passage of animals between the segregation areas 2, 3 and 4 except through the sorter 1 is prevented by fences 5, 6 and 7. Normally animals, such as hogs, to be sorted are held in segregation area 2. Also normally one of the segregation areas 3 or 4 is utilized to hold sorted animals which are ready for market, while the other segregation area is used to hold sorted animals which are not ready for market.

The sorter 1 is comprised of a chute 10 having generally vertical animal restricting side walls 11 and 12 which define an animal enclosing structure having an entrance aperture 13 and an exit aperture 14.

The chute 10 is suitable for allowing a single animal to ambulate thereinto, for holding the animal therein while the animal's weight is determined, and for allowing the animal to ambulate therefrom after the animal's weight is determined. The illustrated chute 10 also includes a housing structure 16 comprising horizontal side slats 17 extending between opposite ends of the chute 10 on either side thereof, spaced top slats 18 also extending between opposite ends of the chute 10, and generally rectangular shaped frames 19 and 20, at opposite ends of the chute 10. The frames 19 and 20 define the entrance and exit apertures 13 and 14 respectively and are fixedly attached to the slats 17 and 18. The front frame 19 comprises vertical side members 24, transverse horizontal top member 25, and transverse horizontal bottom member 26. Mobilization wheels 27 are pivotally attached near the bottom of each of the front frame side members 24. The rear frame 20 comprises vertical side members 30, a pair of closely positioned transverse horizontal top members 31 and 32, and a transverse bottom horizontal member 33.

Associated with the chute 10 are weighing means, such as the illustrated gravity scale 35 or the like. The scale 35 comprises: an animal holding platform 36 to which the side walls 11 and 12 are attached; four platform support wires or lines 37 each positional near and connected to one corner of the platform 36 and extending upwardly therefrom; a pair of horizontal rollers 38 and 39 pivotally attached to the front frame side members 24 and rear frame side members 30 respectively and having the lines 37 wrapped therearound and secured thereto; scale arms 40 and 41 radially extending from the rollers 38 and 39 respectively and being interconnected by link 42 and being connected to a visual weight indicator 43. The weight indicator 43 is hung from a three-sided support frame 47. The frame 47 is attached near the bottom thereof to both top slats 18. When an animal enters the chute 19, it exerts a downward force upon the platform 36 in proportion to the weight thereof. The force is translated to the wires 37 which in turn exert a rotational force on the rollers 38 and 39 which in turn rotate the arms 40 and 41. The arms when rotated downward at the distal ends thereof exert a downward force upon the measurement portion of the weight indicator 43 in proportion to the weight of the animal on the scale 35 which weight is visually shown on the face of the indicator of 43.

An entrance 50 is positioned in the entrance aperture 13 to selectively block access in and out of the chute 10. The entrance gate 50 comprises a pair of spaced bars 51 and a control mechanism 52 for manipulation thereof. The gate bars 51 are best illustrated in FIGS. 1 and 2 and the fragmentary FIG. 9. The bars 51 are attached to horizontal L-shaped members 55 at each end thereof. The bars 51 are slightly arcuate such that when the gate 50 is blocking the entrance aperture 13, that is the gate 50 is closed, then the bars 51 appear vertical from the front, as shown in FIG. 2; whereas when the gate 50 is not blocking the entrance aperture 13, that is the gate 50 is open, then the bars 51 bow or curve outwardly toward the sides of the chute 10 so as to provide a wider opening through which animals may pass. The L-shaped member 55 is pivotally attached near the apex thereof to associated front frame top and bottom members 25 and 26 respectively by pivot bolts 56 and associated fastening hardware 57 or the like (the lower pivot bolts are not shown). A traverse channel shaped member 60 is centered beneath and attached to the front frame top member 25 and extends perpendicularly on opposite sides thereof. The channel member 60 has a longitudinal slot 61 centered transversely in the web 62 thereof with opposite sides of the web 62 being connected near the ends thereof. A slide plate 63 rides on top of the web 62 and has downwardly projecting pivot pin 64 extending through and below the slot 61. A handle 65 extends upwardly from near a front end of the slide plate 63. When positioned to slide on the web 62, the slide plate 63 is prevented from upward movement by a bolt and appropriate fastener 66. A pair of connector links 70 are pivotally mounted at one end thereof to the pivot pin 64 so as to rotate in a horizontal plane and held thereon by a cotter pin 71 or the like. A pivot pin 72 is attached to the opposite end of each connector link 70. The connector link pivot pins 72 are pivotally attached by appropriate hardware 73 to an end of an associated L-shaped member 55 opposite the end to which two bars 51 are attached, such that when the handle 65 is physically manipulated to slide the plate 63 along the web 62, the connector links 70 are moved either from a position wherein they are generally parallel to a position wherein they form angles with one another or vice versa. As the angle increases between the connector links 70, the pivot pins 72 must approach one another which in turn rotates the L-shaped members 55 about the pivot bolts 56 which in turn opens the gate 50. Straightening the connector links 70 relative to each other closes the entrance gate 50. The front frame top member has a slot 75 therein from front to rear and side to side. First and second remote operating arms 76 and 77 which will be discussed in greater detail hereinafter extend through the slot 75. A rivet 78 or the like and one of the bolts 56 is positioned on each side of associated arms 76 and 77 so as to allow free transverse movement of the arms 76 and 77 but to prevent substantial transverse movement thereof with respect to the entrance frame 19.

A first exit gate 80 selectively blocks egress of an animal from the chute 10 when the exit gate 80 is in a closed position. The exit gate 80 also has two open positions which will be discussed below. The first exit gate 80 includes a rectangular frame structure 81 with a wire mesh 82 streched over the frame structure 81 (as used herein, mesh is understood to mean a structural weave having wide enough interstices to allow sufficient light to pass therethrough, such that an animal will be encouraged to enter the chute 10 believing that the exit is open, yet narrow enough interstices to prevent the animal from becoming entangled therein or fighting the gate 80). As is shown in FIG. 1 and FIG. 8, the gate frame structure 81 is attached to a tube 83 on one side thereof. The tube 83 is in turn pivotally attached to one side of the exit aperture 14 by a pivot rod 84 passing through the tube 83, and the top and bottom rear frame members 32 and 33. The pivot rod 84 is secured by cotter pins 85 or the like, such that the gate 80 pivots about a vertical axis at one side of the exit aperture 14. Positioned on top of the frame structure 81 is a riser portion 88 having a generally upwardly opening horizontal slot 89 therein. The slot 89 extends radially outward from the tube 83.

A rectangular gate support frame 90 extends perpendicularly rearward from and is fixedly attached to the exit frame 20 on the opposite side thereof relative to the pivotal attachment of the first exit gate 80 to the exit frame 20. The gate support frame 90 includes a rear side member 91, a top member 92 and a bottom member 93. A cross brace 94 interconnects a rearward end of the gate frame top member 92 with the exit frame top member 32 at the axis of the first gate 80.

A second exit gate 97 is pivotally mounted in the gate support frame 90 near a rearward end thereof so as to have a vertical axis. The gate 97 includes a frame structure 98 having a wire mesh stretched thereover so as to prevent passage of an animal therethrough. A tube 100 is attached to one side of the gate 97. The tube 100 is pivotally attached to the gate support frame top and bottom members 92 and 93 by a pivot rod 101 held in place by cotter pins 102 or the like. A riser portion 103 extends upward from the support frame top member 92 and has an upwardly opening slot 104 extending radially outward from the tube 100 therein. The second exit gate 81 is thus pivotally connected to the chute 10 at a location spaced from the exit aperture 14 and rearwardly of the side of the exit aperture 14 opposite the side thereof to which the first gate 80 is pivotally attached.

Remote manipulation means and securing means are provided for the exit gates 80 and 97; however, since both means are closely related in the present embodiment, they will be discussed contemporaneously.

In particular, a beam 115 extends from approximately midway along the cross brace 94 traversely to approximately midway along the exit frame top member 32 being secured thereat by a suitable fastener 116. A lever arm and mechanical advantage means such as are shown combined in a cross-shaped link member 117 are pivotally attached by a pivot pin 118 at one end thereof to the beam 115 by a suitable receiver thereon and a cotter pin or the like about midway along the beam 115. An opposite end of the link member 117 from the pin 118 has attached thereto another slot follower such as the illustrated pivot pin 119 extending downwardly therefrom and suitable for mating in the slot 89 on the first exit gate 80. The length of the portion 120 of the link member 117 between the two pivot pins 118 and 119 is such that when the pins 118 and 119 are transversely aligned the gate 80 is perpendicular to the exit aperture 14 and when the pins 118 and 119 are traversely aligned the gate 80 is closed. In addition when the pins 118 and 119 are transversly aligned, there is a rearwardly projecting portion 121 of the link member 117 to which the remote operating arm 76 is pivotally attached by bolt 122 or the like at a location spaced from the plane joining the pins 118 and 119. As can be seen in FIG. 6, the slot 89 extends just slightly beyond the location of the pin 119 therein when the gate 80 is perpendicular to the exit aperture 14. The operating arm 76 has a handle 123 which when manually moved rearward by an operator, while the gate 80 is in the position of FIG. 6, places a rearward thrust on the juncture of link member portion 117 and operating arm 76. Since the link member portion 120 is only pivotally attached on one end thereof of the beam 115, a lever arm is produced which is defined by the perpendicular distance between the operating arm 76 and the pin 118, when in the position of FIG. 6. The thrust on this lever arm in turn thrusts the free end of the link member portion 117 with the pin 119 thereon rearward until the pin 119 engages the end of the slot 89. At this point the gate 80 may be canted an insignificant amount with respect to a perpendicular line from the exit aperture 14. This in effect creates an over center locking mechanism for the gate 80. In particular, an animal trying to push the gate 80 counterclockwise, when the pin 119 is touching the outermost end of the slot 89, exerts pressure against the pin 119 and end of the slot 89 but cannot move the gate 80 unless the pin 119 breaks. Likewise, if the animal attempts to push the gate 80 clockwise, the gate 80 will assume the position perpendicular to the exit aperture 14 but will move no further, since that is the maximum extension the length of the link member 117 between the pins 118 and 119 will allow.

In like manner frontwards movement of the operating arm 76, when in the position of FIG. 6, places a frontwards thrust on the interconnection of the operating arm 76 and the link member 117. The link member 117 begins to pivot about the pin 118 which urges the pin 119 along the slot 89, this in turn urges the gate 80 to rotate counterclockwise. As the link member 117 continues to rotate, the lever arm acting to create the rotation continually changes. When the gate 80 has rotated to the position shown in FIG. 5, the gate 80 is closed and the distance along the link member portion 120 between the interconnection thereof with the operating arm 76 and the portion 121 is now effectively acting as the lever arm which will create further movement in the gate 80 if the operating arm 76 is moved. At this point a slight additional functional thrust on the operating arm 76 places the pin 119 again over center and against the end of the slot 89 such that an animal cannot move the gate 80 by pushing thereagainst. Thus the above described mechanism functions both as remote control means and locking or securing means.

For the secondary exit gate 97 the principals of securing and remote control are essentially the same as those discussed above regarding the first exit gate 80. In particular, there is a cross beam 127 secured by suitable fasteners such as bolts 128 to an intermediate location along gate frame top member 92 and cross brace 94 approximately one quarter of the length of each from the axis of the second exit gate 97. A cross shaped link member 130 has a first portion 131 perpendicularly aligned with a second portion 132. The first portion 131 are projecting vertical pins 133 and 134 on opposite sides and ends thereof. The pin 133 pivotally seats in approximately the center of the cross beam 127. The pin 134 mates with the slot 104 in the second exit gate 97. A two part linkage 135 interconnects the link member second portion 132 at a location spaced from the plane of the pins 133 and 134 with the operating arm 77. The linkage 135 comprises a link 140 and a slide member 141. The link 140 has pivotal connectors on opposite sides and ends thereof such as pins 142, for connection to the link member second portion 132. The slide member 141 has, on the end thereof attached to the link 140, a recessed portion 143 suitable for sliding freely along the edge of the gate frame top member 92 and is pivotally attached at the opposite end thereof to the beam 115 and cross brace 94 by bolt 116. Approximately midway therealong the slide member 141 is pivotally attached to the operating arm 77.

For the second exit gate 97, when in the position shown in FIG. 6, a rearward thrust on the operating arm tends to rotate the slide member 141 clockwise which in turn acts through the link 140 and cross-shaped member 130 to rotate the gate 87 counterclockwise into the position shown in FIG. 7. Slight additional thrust on the operating arm 77 will force the pivot pin 134 against the end of the slot 104 furthermost from the axis of the gate 97. Reversal of thrust on either of the operating arms 76 and 77 from that discussed above will reverse the effect stated above.

It is noted that the structure of the illustrated embodiment is such that the exit gates 80 and 97 along with all associated mechanisms and controls can be reversed such that the gates 80 and 97 would be on opposite sides of the chute 10 as compared to the illustrated embodiment.

It is foreseen that other mechanisms of known mechanical advantage could be utilized to replace the operating arms 76 and 77. In particular a system of pulleys and cables or the like may be utilized to rotate the slide member 141 and cross-shaped link member 117.

In use an operator opens the entrance gate 50 by manipulating the slide plate 63 such that the connector links 70 approach being parallel, although in the illustrated embodiment the links 70 do not reach a parallel position, and the entrance gate 50 is open. The operator also manipulates the operating arm 76 to close the first exit gate 80. The operator then urges an animal into the chute 10, closes the entrance gate 50, and determines the weight of the animal by reading the weight indicator 43. A determination is then made as to which segregation pen 3 or 4 the animal should enter based upon the weight. If pen 3 is desired, first the operating arm 77 is pulled frontwardly, thereby positioning the second exit gate 97 generally perpendicular to the exit aperture 14 and the operating arm 76 is pushed rearwardly opening the second exit gate 80, such that the latter is also generally perpendicular to the exit aperture 14. The animal when the gates 80 and 97 are so positioned has an open passageway from the chute 10 into holding pen 3. Should pen 4 be desired, the operating arm is pushed rearwardly until the position shown in FIG. 7 is obtained. The operating arm 76 is then pushed forward until the first exit gate 80 engages the second exit gate 97 such that the gates 80 and 97 are generally aligned. At such a time an animal in the chute 10 is free to egress into holding pen 4. Preferably the operator locks all gates into the secured positions discussed above whenever possible, so that animals cannot force a gate and thereby reach a pen wherein the animal would be of improper weight and also so that the animal cannot leave the chute 10 until weight determination is complete.

It is to be understood that while certain embodiments of the present invention have been described and shown herein, it is not to be limited to specific forms or arrangement of parts herein described and shown.

What is claimed and desired to secure by Letters Patent is:

1. An apparatus for sorting animals comprising:
   (a) a chute having sides adapted for enclosing an animal and having an entrance end and an exit end; said exit end being adapted for communicating with first and second animal segregation areas;
   (b) weighing means associated with said chute for determining weight of an animal enclosed in said chute;
   (c) a first gate being pivotally connected to said chute near one side of said chute exit end; said first gate having a first operative position wherein said first gate is generally parallel to said exit end, a second operative position wherein said first gate is at an acute angle with respect to said exit end, and a third position wherein said first gate is generally perpendicular to said exit end;
   (d) a second gate being pivotally connected to said chute at a location spaced outwardly from an opposite side of said chute exit end; said second gate having a first operative position generally perpendicular to said chute exit end and having a second operative position wherein said second gate is generally aligned with said first gate while said first gate is in said second operative position thereof; and (e) mechanical means for selectively moving said first and second gates through the operative positions thereof;

(f) whereby when said first gate is in said first position thereof, said chute enclosed animal is prevented from egressing from said chute exit end; when said first gate is in said second position thereof and said second gate is in said second position thereof, said chute enclosed animal is free to egress from said chute into said first animal segregation area; and when said first gate is in said third position thereof and said second gate is in said first position thereof, said chute enclosed animal is free to egress from said chute into said second animal segregation area.

2. The apparatus according to claim 1 wherein:
(a) said first gate and said second gate have operating means associated therewith whereby said first and second gates are remotely operable.

3. The apparatus according to claim 2 including:
(a) over center locking means for each of said first and second gates whereby when said first gate is in said first operative position thereof, when said second gate is in said first operative position thereof, and when said second gate is in said second operative position thereof, then said first and second gates in each such position are respectively secured against substantial movement by an animal pushing thereagainst.

4. The apparatus according to claim 2 or 3 including:
(a) an entrance gate for selectively blocking entrance to said chute.

5. The apparatus according to claim 4 wherein:
(a) said entrance gate has a control mechanism associated therewith; and
(b) said operating means associated with each of said first and second gates and said entrance gate control mechanism are operable from a single location.

* * * * *